(12) United States Patent
Heckman

(10) Patent No.: US 6,930,784 B2
(45) Date of Patent: Aug. 16, 2005

(54) APPARATUS AND METHOD FOR SHOWING CONTOUR LINES IN MODELING

(75) Inventor: Thad Heckman, Carbondale, IL (US)

(73) Assignee: Board of Trustees of Southern Illinois University, Carbondale, IL (US)

( * ) Notice: Subject to any disclaimer, the term of this patent is extended or adjusted under 35 U.S.C. 154(b) by 121 days.

(21) Appl. No.: 10/041,699

(22) Filed: Jan. 8, 2002

(65) Prior Publication Data

US 2003/0002053 A1 Jan. 2, 2003

Related U.S. Application Data

(60) Provisional application No. 60/260,295, filed on Jan. 8, 2001, now abandoned.

(51) Int. Cl.[7] .............................................. G01B 11/24
(52) U.S. Cl. ........................ 356/601; 33/20.1; 434/152
(58) Field of Search ................................ 356/600–614, 356/625, 3.03, 3.09, 3.1, 4.08, 139.1, 2; 250/560–561, 236; 33/20.1, 21.1; 434/72, 151–152; 359/439; 345/418, 582, 629; 446/87, 110; 52/283.1

(56) References Cited

U.S. PATENT DOCUMENTS

| | | | | |
|---|---|---|---|---|
| 3,742,620 A | * | 7/1973 | Knoll | 434/152 |
| 3,749,493 A | * | 7/1973 | Macovski | 356/2 |
| 3,851,961 A | * | 12/1974 | Winzer | 353/38 |
| 4,070,683 A | * | 1/1978 | Allschuler et al. | 356/2 |
| 4,089,608 A | * | 5/1978 | Hoadley | 356/601 |
| 4,465,937 A | * | 8/1984 | Forbes | 250/559.24 |
| 4,571,835 A | * | 2/1986 | Nishio | 33/20.1 |
| 4,743,769 A | * | 5/1988 | Schwaiger et al. | 250/559.19 |
| H503 H | * | 8/1988 | Keller | 356/152 |
| 4,856,997 A | * | 8/1989 | Mellecker | 434/72 |
| 4,951,151 A | * | 8/1990 | Sorenson et al. | 348/744 |
| 4,970,666 A | * | 11/1990 | Welsh et al. | 345/423 |
| 5,838,428 A | * | 11/1998 | Pipitone et al. | 356/3.09 |
| 5,953,130 A | * | 9/1999 | Benedict et al. | 356/429 |
| 6,542,249 B1 | * | 4/2003 | Kofman et al. | 356/601 |
| 6,556,211 B2 | * | 4/2003 | Davis | 345/582 |

FOREIGN PATENT DOCUMENTS

| | | | |
|---|---|---|---|
| JP | 04 121 778 | * | 4/1992 |
| JP | 08 220 979 | * | 8/1996 |
| JP | 09 325 691 | * | 12/1997 |
| JP | 10 153 960 | * | 6/1998 |

* cited by examiner

Primary Examiner—Gregory J. Toatley, Jr.
Assistant Examiner—Sang H. Nguyen
(74) Attorney, Agent, or Firm—Harness Dickey & Pierce PLC

(57) ABSTRACT

An apparatus for depicting contour lines on the surfaces of a model, the apparatus comprising a bed for supporting the model, and at least one laser for projecting a plane of light at a predetermine height from the bed. A method of depicting contour lines on surfaces of a model, the method comprising projecting a plurality of planes of light in spaced relation over the surface of a support to illuminate contour lines on objects on the surface that break the planes of light.

14 Claims, 9 Drawing Sheets

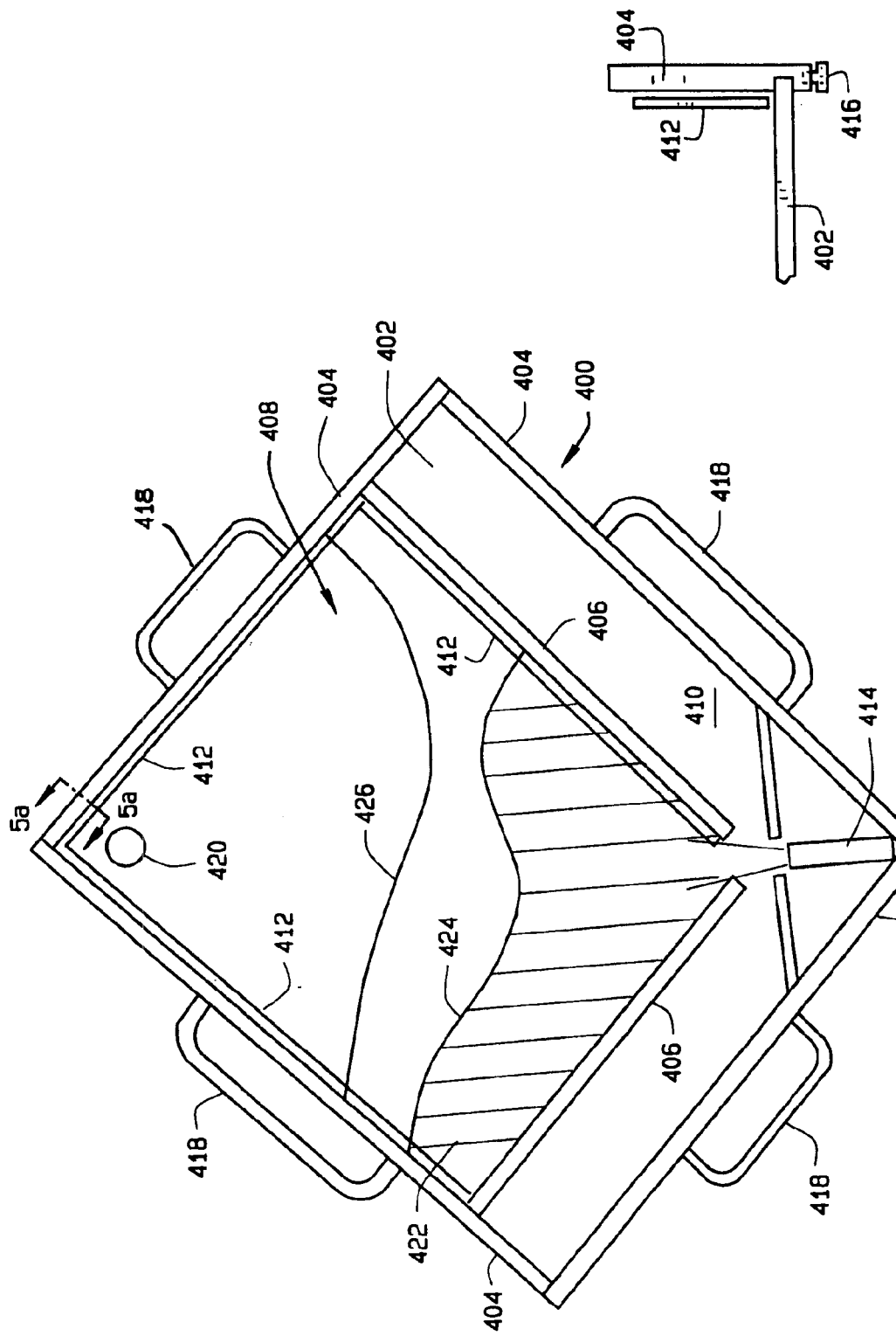

APPARATUS AND METHOD FOR SHOWING CONTOUR LINES IN MODELING

CROSS-REFERENCE TO RELATED APPLICATION

This application claims priority from prior provisional application Ser. No. 60/260,295, filed Jan. 8, 2001 now abandoned, the disclosure of which is incorporated herein in its entirety.

BACKGROUND OF THE INVENTION

This invention relates to a device and method for visualizing the contours and surfaces of land and buildings.

Modeling is frequently used in architecture to depict what a particular building and surrounding area will look like. However, even when the model is accurately made, it can still be difficult to visualize contours and relative heights of features, particularly features that are separated by appreciable differences. More basically, it can be difficult to properly construct a model that accurately depicts surfaces and contours.

SUMMARY OF THE INVENTION

The present invention relates to a device that assists accurately making models and helps those viewing models to understand the relationships between the surfaces and contours of the objects depicted in the model. The present invention also relates to a method of constructing models, and displaying models in manner that makes it easier to understand the relationships between the surfaces and contours of the objects depicted in the model.

BRIEF DESCRIPTION OF THE DRAWINGS

FIG. 5 is a top plan view of a fourth embodiment of an apparatus constructed according to the principles of this invention;

FIG. 5a is a partial vertical cross sectional view of the apparatus taken along the plane of line 5a—5a in FIG. 5;

DETAILED DESCRIPTION OF THE INVENTION

The apparatus of this invention comprises a substantially horizontal bed, surrounded by generally vertical walls created a space in which a model can be created and viewed. The apparatus includes equipment for projecting planes of light across the space, at different heights from the bed. These planes of light strike the model built in the space at different heights, revealing the relative heights and contours of the surfaces of the model where the light planes strike the model.

Figure 1:
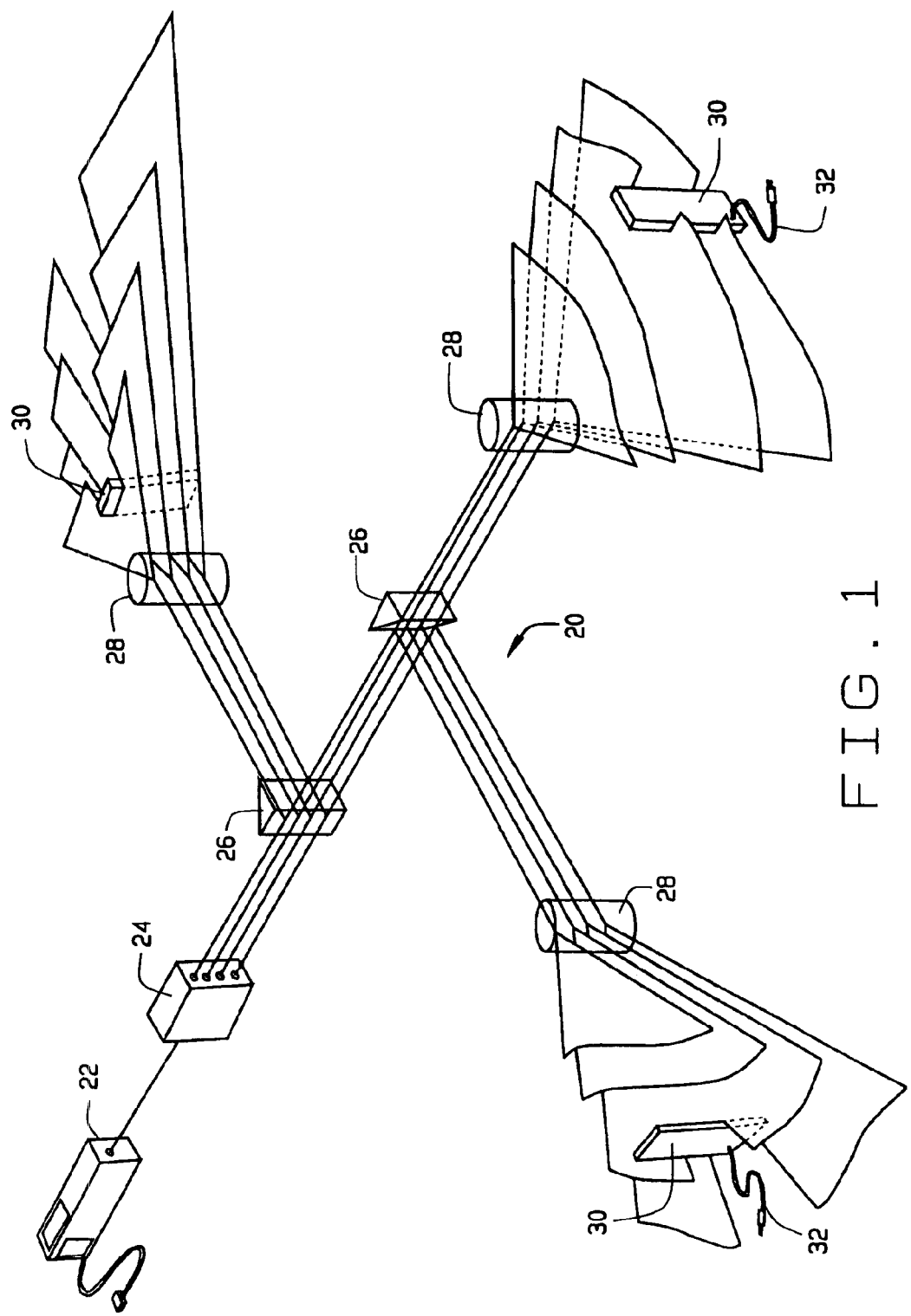
FIG. 1 is a schematic view of a Laser System for use in the apparatus and method of the invention.

A system 20 for generating the planes of light for a plurality of modeling apparatus (three as shown in FIG. 1) is shown schematically in FIG. 1. The system 20 comprises a laser source 22, which may be a single source of a single beam, which as shown can be later split, or multiple sources of singles beams, which eliminate the need for a splitter. In the latter case, the multiple sources can each be of the same color, but are preferably of different colors (e.g., red., green, blue, green) so that adjacent beams can be distinguished from each other. The laser source 22 is preferably one that can run on conventional house hold current, and has a power cord and plug adapted to be connected to a conventional electric socket.

Where the laser source 22 provides a single beam B, a splitter 24 can be provided to split the single beam B into a plurality (four as shown in FIG. 1) of vertically spaced beams. The beams output from the splitter 24 may be fixed at a pre-selected spacing, or the spacing between the beams can be adjustable. While the beams generated by the splitter 24 are preferably evenly spaced, the spacing between the beams could be made variable to facilitate the visualization of shallow slopes.

The beams from the laser source 22, or the beams from the splitter 24, are distributed by a plurality of mirrors prisms 26 positioned around the working area of the system 20 to a plurality of separate modeling apparatus. The mirrors or prisms 26 distribute the plurality of beams to defracting prisms 28 at each site, which spread the beams into fan shapes as illustrated. These fan shaped beams are delivered into each apparatus for projecting planes of light at different levels. The distribution of the laser light with the mirrors or prisms 26 and defracting prisms 28, allows the spacing of the beams/planes of light to be quickly and easily adjusted for all of the apparatus at the source 22 or the splitter 24. The positions and orientations of the prisms or mirrors 26, and of the defracting prisms 28 are adjustable to allow the position and shape of the planes of light to be adjusted.

Sensors 30 can measure light to record the positions of objects between the defracting prism 28 and the sensor 30. The sensors 30 can be simple light sensors, or the sensors can sense particular wave lengths/frequencies. There are leads 32 extend from sensors to connect to measuring, storage, and display devices. Each system can be surrounded by a reflecting perimeter walls, that help to establish a series of vertically spaced planes of high intensity colored light, which when a plane or planes are broken, form visible lines on the object breaking the planes, which reveal the position and slope of the objects in each apparatus.

Figure 2:
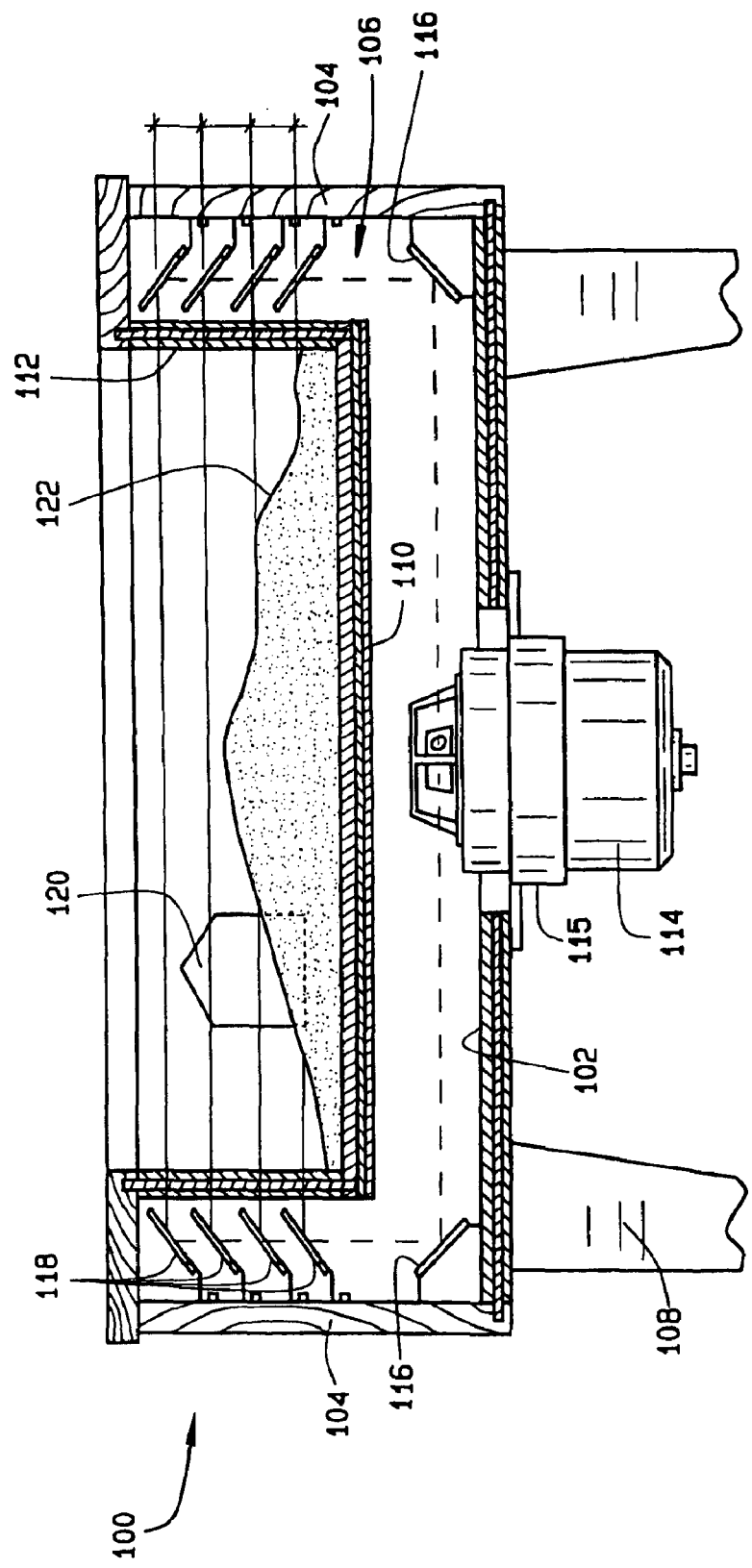
FIG. 2 is a vertical cross sectional view of a first embodiment of an apparatus for making and viewing models in accordance with the principles of this invention.

A first embodiment of an apparatus constructed according to the principles of this invention is indicated as 100 in FIG. 2. Apparatus 100 comprises a rectangular bottom 102 and four vertical sides 104, defining a space 106. The bottom 102 is preferably supported by legs 108 at a convenient height for working and viewing. Inside the space 106 is a generally horizontal rectangular bed 110 and four vertical walls 112, spaced from the bottom 102 and the vertical sides 104. The walls 112 are preferably transparent. A rotating laser source 114 is mounted in the bottom 102, with a bracket 115 on the rotating laser source 114, and having a flange for attachment to the bottom. A portion of the rotating laser source extends through an opening in the bottom 102, into a space between the bottom 102 and the bed 110. The rotating laser source 114 projects a beam horizontally 360°. There are mirrors 116 mounted in the corners between the bottom 102 and the sides 104. The mirrors 116 direct the beam from the laser 114 vertically upwardly in the space between the vertical sides 104 and the vertical walls 112, on all sides of the bed 110. There are a plurality of half-slivered mirrors 118 mounted in the space between the vertical sides 104 and the vertical walls 112. The mirrors 118 are oriented at an angle so direct a portion laser beams horizontally, parallel to the bed 110 at different levels. Alternatively lenses, prisms, or some other means could be used in place of mirrors 116 and 118 to distribute the laser light into vertically spaced planes extending over the bed 110. The planes are preferably evenly spaced, to display the contours of models build on the bed 110, although the planes do not have to be evenly spaced. The spacing of the mirrors 118 can be made adjustable, to change the vertical spacing of the contour lines that are projected onto models on the bed 110.

While the device is described as having a rectangular bottom 102 with four sides 104, and a rectangular bed 110 and four vertical walls 112, either or both of these structures should have some other shape, although the rectangular or square shape described herein is preferred for ease of construction and uniform distribution of planes of light.

A model building 120 can be built on the bed 110, and sand or other material used to form the surface 122 of the ground surrounding the building. Contour lines appear on the surface of the model building 120 and the sand 122, showing the relative heights of the various features modeled. The contour lines can also be used to facilitate making the model, placing the model building 120 and shaping the surface 122 of the ground surrounding the building.

Figure 3:
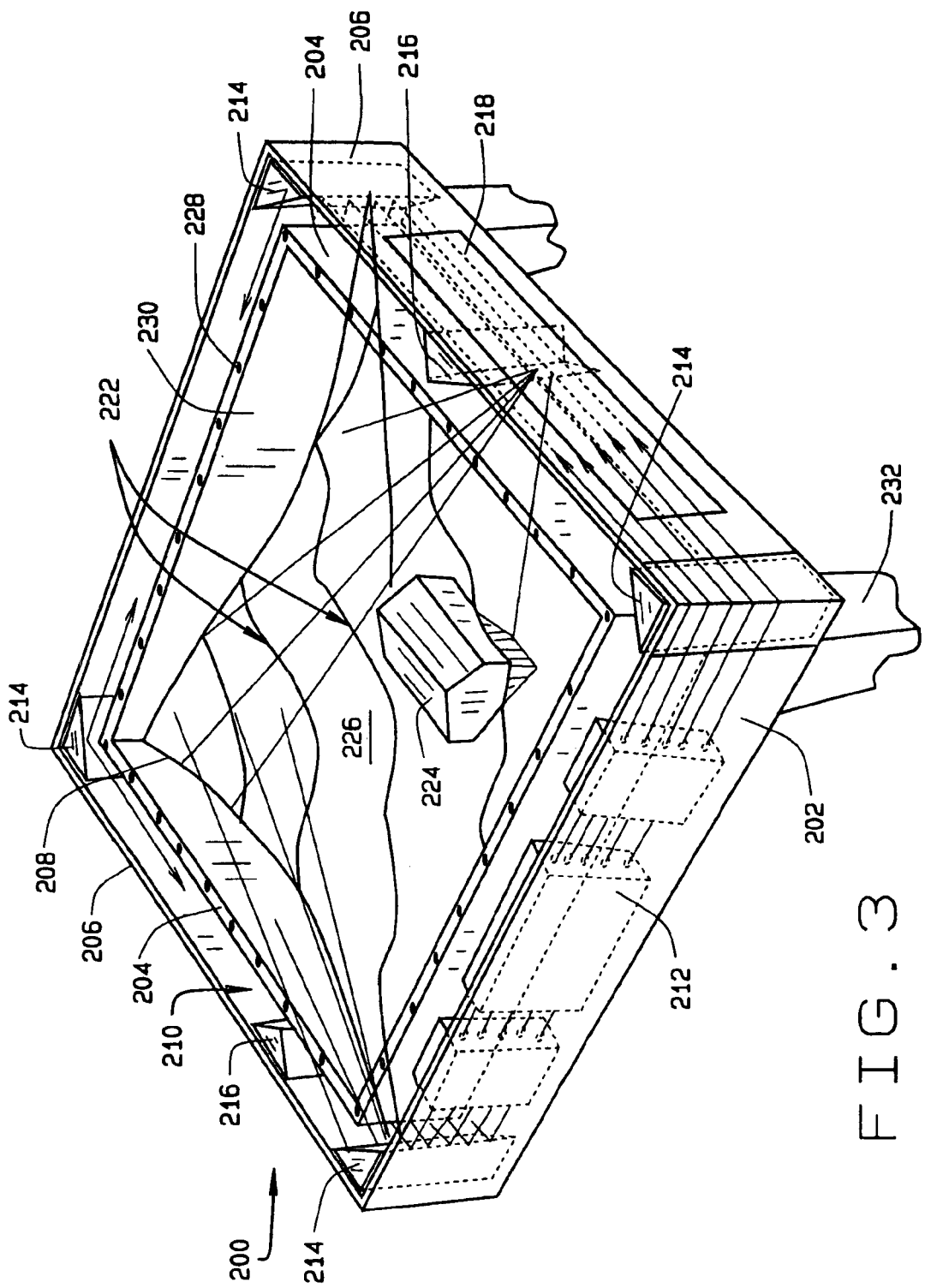
FIG. 3 is a perspective view of a second embodiment of an apparatus for making and viewing models in accordance with the principles of this invention.

A second embodiment of an apparatus constructed according to the principles of this invention is indicated as 200 in FIG. 3. The apparatus 200 comprises a generally rectangular bed 202 and a set of four transparent inner walls 204 and a set of four opaque outer walls 206. While the device is described as having a rectangular bed 202 with four inner walls 204 and four outer walls 206, the apparatus could have some other shape, although the rectangular or square shape described herein is preferred for ease of construction and uniform distribution of planes of light. There is a space 208 inside the inner walls 204, and a space 210 between the inner walls and the outer walls 206, surrounding the space 208. At least one laser source 212 is positioned in the space 208 between the inner walls 204 and outer walls 206. The laser source 212 preferably provides a plurality of vertically spaced beams. Alternatively, there could be a plurality of vertically spaced laser sources that provide a plurality of vertically spaced beams, or beam splitters could be provided to provide a plurality of vertically spaced beams.

Prisms 214 in the space 210 direct the beams from the laser source or sources 212 around the workspace inside the inner walls. Prisms 216 in the space 210 fan the beams out, and directing the fanned beams inwardly through the inner walls 204 and into the space 208. In this preferred embodiment wherein the bed 202 is rectangular, four prisms 214 can be provided, one in each corner, and two prisms 216 can be provided on opposites sides of the bed 202. Of course, instead of prisms 214 and 216, lenses, mirrors or some other device can be provided for distributing light around the space between the walls 204 and 206, and for fanning beams of light through the walls 204 and across the bed 202.

The inner walls 204 can be made transparent, as indicated above, or the inner walls can have transparent windows aligned with the prisms 216 to permit the fanned beams to be directed into the space 208. The fanned beams create planes of light that form contour lines 222 on the surfaces in the space 208. These contour lines help viewers to visualize the contours and surfaces. The contour lines 222 also help construct models in the space 208. The outer wall 206 can have windows 218 therein, aligned with transparent portions of the inner walls, so that the model and the projected contour lines can be viewed from the sides. Index marks 220 can be provided adjacent the windows to shown the contour line spacing. A model, such as a building 224 and a contoured land surface 226, can be built into the spaced, and the laser light forms a plurality of contour lines that reveal the shape and slope of the building 224 and land surface 226. A plurality of pins 228 can be provided in spaced relation on the tops of the inner walls 204, 50 that strings 230 can be placed in a criss-crossing grid over space 208 to provide a frame of reference for constructing and/or interpreting the models assembled in the space 208. The apparatus 200 can be supported at a convenient height for working/viewing by legs 232.

Figure 4:
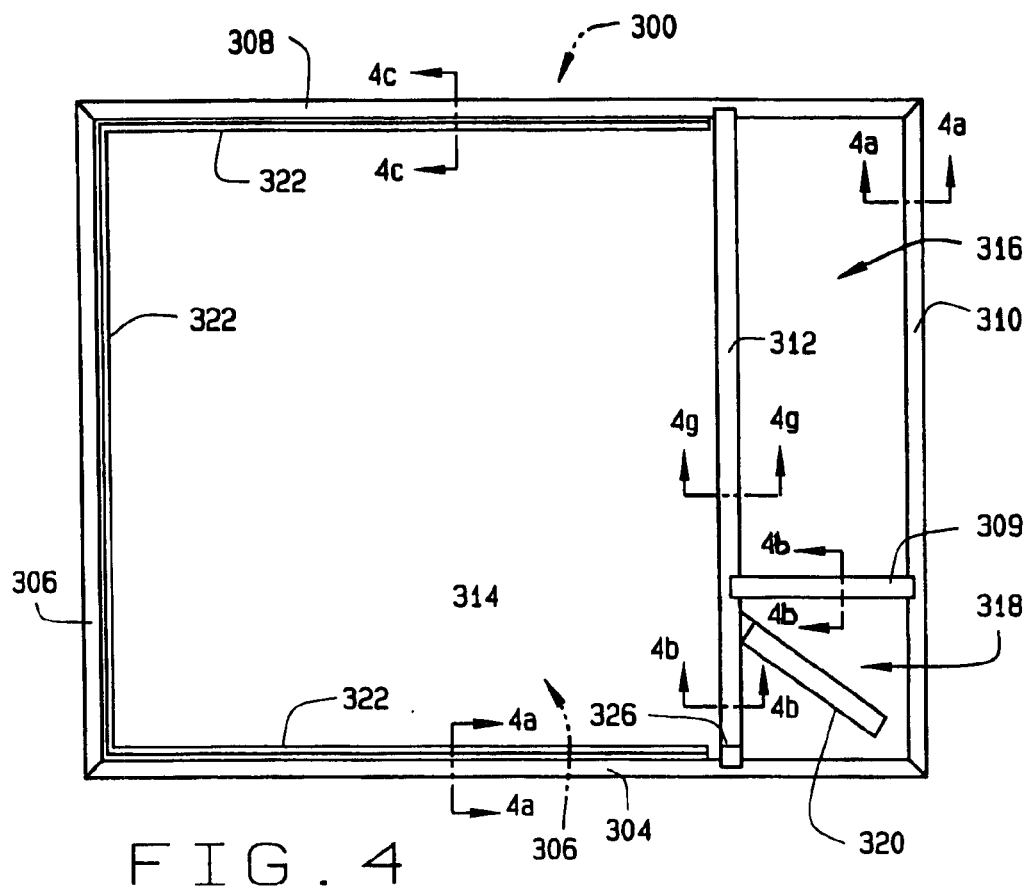
FIG. 4 is a plan view of a third embodiment of an apparatus constructed according to the principles of this invention.

A third embodiment of an apparatus constructed according to the principles of this invention is indicated as 300 in FIG. 4. As shown in FIG. 6, the apparatus 300 comprises bottom bed 302, surrounded by sidewalls 304, 306, 308, and 310. A wall 312 extends parallel to one of the side walls 304, dividing the apparatus into a workspace 314, and a storage compartment 316. A wall 309 forms a laser compartment 310 outside the workspace 314. The storage compartment 316 can hold various equipment to be placed into the workspace 314. The laser compartment 318 holds one or more lasers 320. The lasers 320 are adapted to project a fan-shaped beam into the work space 314 at different heights from the bottom bed 302. At least two of the walls surrounding the workspace 314 have mirrors 322, and preferably at least three of the walls 304, 306, and 308 have mirrors. The mirrors 322 reflect the fan-shaped laser beam, forming planes of laser light, which form contour lines 360° around surfaces that project from the bed 302.

Figure 4A:
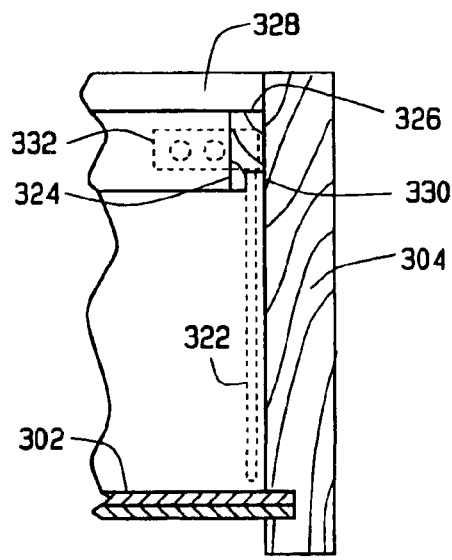
FIG. 4a is a partial vertical cross-sectional view of the apparatus, taken along the plane of any of the lines 4a—4a in FIG. 4.

FIG. 4a is a partial vertical cross-sectional view of the apparatus, taken along the plane of line 4a—4a in FIG. 4. As shown in FIG. 4a, the bottom 302 fits in a dado in the lower portion of the walls 304, 306, 308, and 310. There is a rim 324 secured adjacent the top edge of the walls 304, 306, and 308 that forms a shoulder 326 for supporting a lid 328. The rim 324 also has a cutout 330 that engages the top of the mirrors 322 to hold them on the walls. L-shaped corner brackets 332 help hold the walls together. In addition, the joints between adjacent walls 304, 306, 208, and 310 can be rabbetted.

Figure 4B:
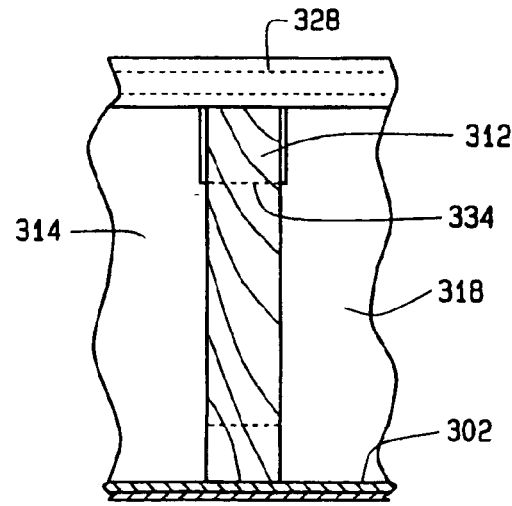
FIG. 4b is a partial vertical cross-sectional view of the apparatus taken along the plane of any of the lines 4b—4b in FIG. 4

FIG. 4b is a partial vertical cross-sectional view of the apparatus taken along the plane of line 4b—4b in FIG. 4. As shown in FIG. 4b, the portion of the wall 312 between the laser compartment 318 and the workspace 314 has a window 334 therein, so that the lasers 320 in the laser compartment 318 can project their fan-shaped beams into the workspace 314.

Figure 4C:
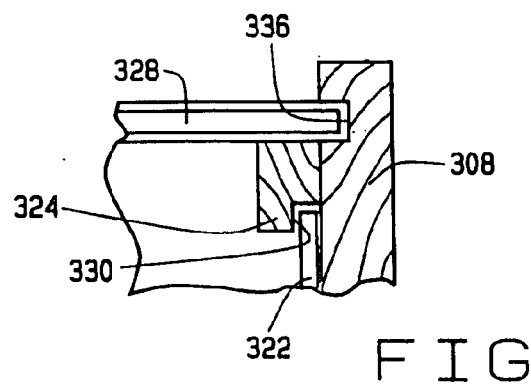
FIG. 4c is an enlarged partial vertical cross-sectional view of the apparatus taken along the plane of line 4c—4c in FIG. 4.

FIG. 4c is an enlarged partial vertical cross-sectional view of the apparatus taken along the plane of line 4c—4c in FIG. 4. Three of the walls 304, 306, 308, and 310 are preferably extend vertically higher than the fourth wall, and have groove 336 therein for receiving the edge margins of the lid 328, so that the lid 328 can be slid into and out of the apparatus. In this preferred embodiment, walls 306, 308, and 310 extend vertically above wall 304, and have the groove 336, the wall 308 being shown in FIG. 4c. A handle 318 is provided so that the apparatus 300 can be transported more easily.

Figure 4D:
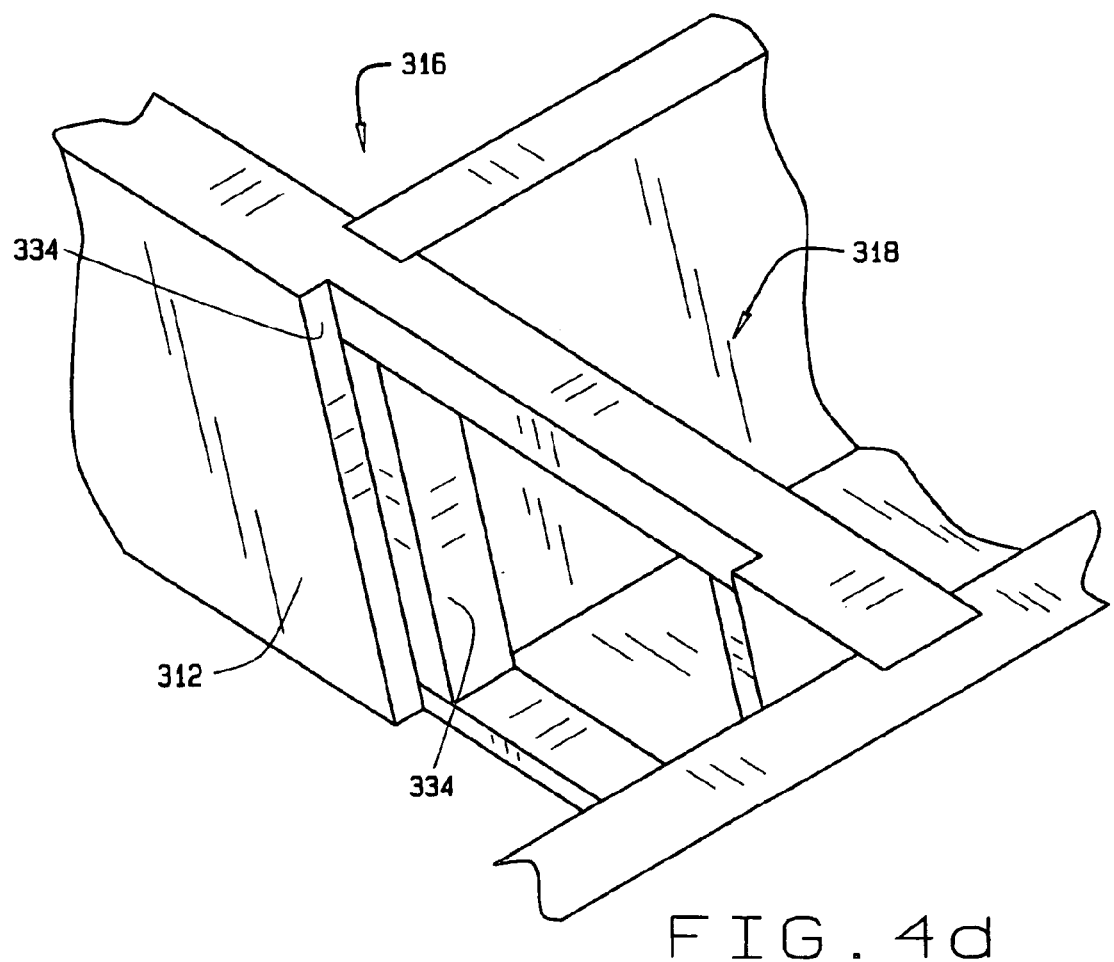
FIG. 4d is a partial perspective view of the window in the laser compartment 310.
Figure 4E:
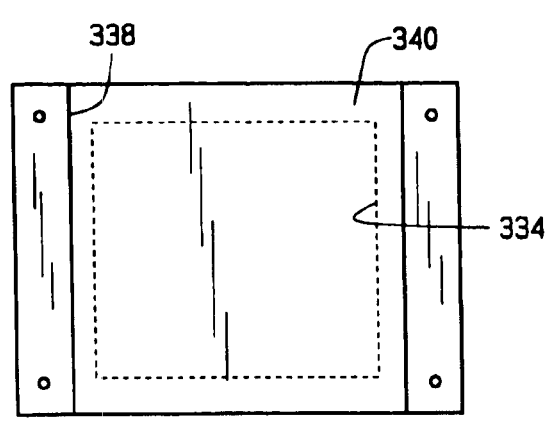
FIG. 4e is a front elevation view of the window.

FIG. 4d is a partial perspective view of the window 334 in the laser compartment 318, that allows the fan shaped laser beams from the laser 320 to project into the work space 314. FIG. 4e is a front elevation view of the window 334. As shown in FIGS. 4d and 4e, there is preferably a recess 338 on the workspace side of the widow 334, which mounts a transparent plastic pane 340.

Figure 4G:
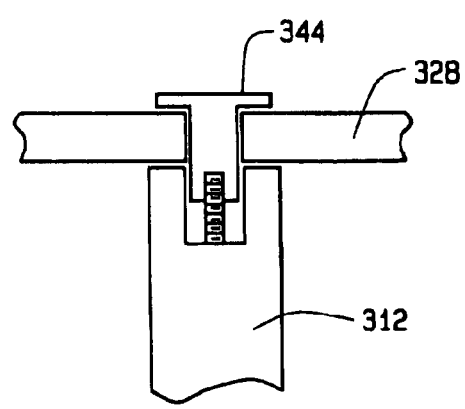
FIG. 4g is a partial vertical cross-sectional view showing the removable attachment of the lid.
Figure 4F:
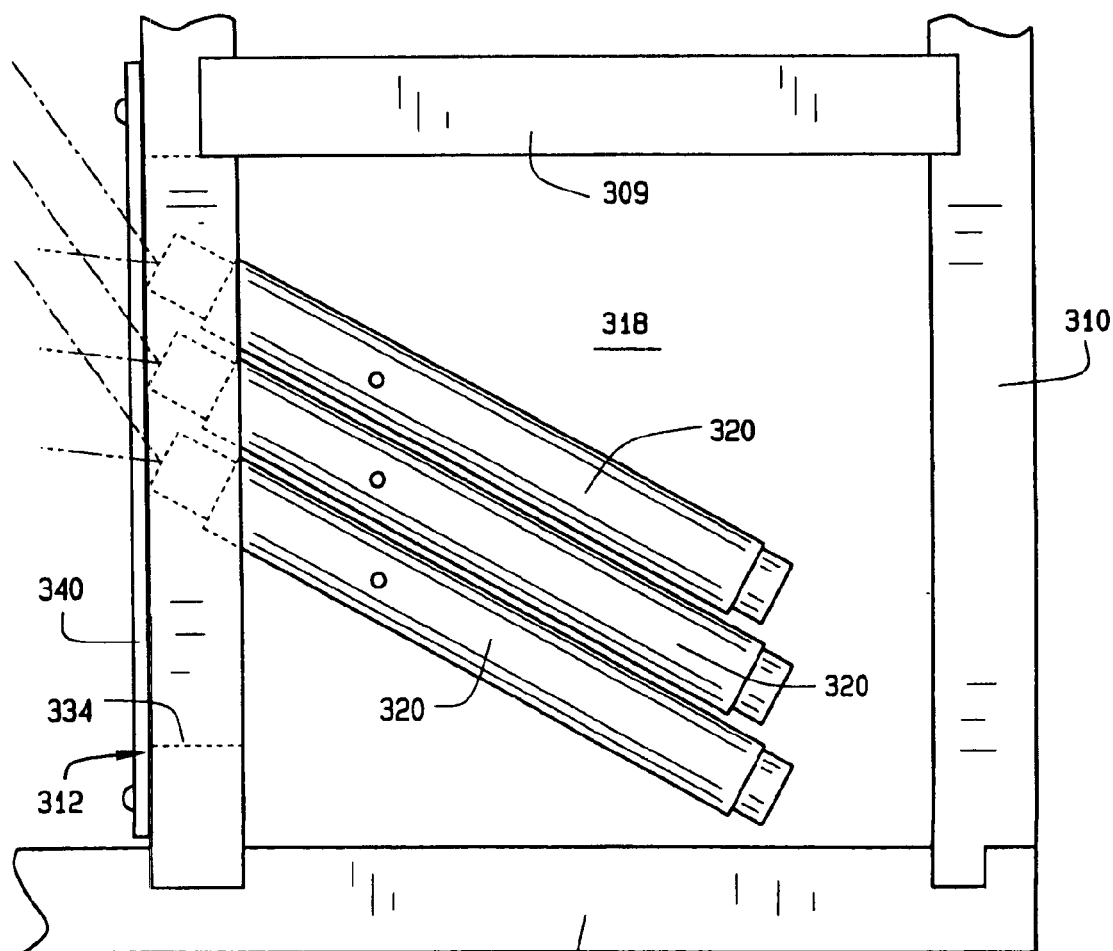
FIG. 4f is an enlarged plan view of the laser compartment, showing supports for supporting three lasers at three different heights.
Figure 6D:
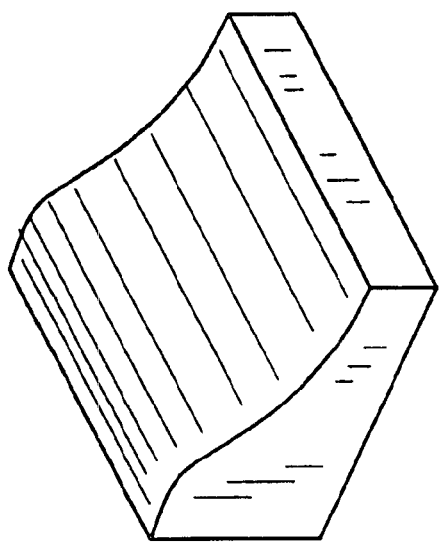
FIGS. 6a through 6e are models of various land shapes that can be placed into the apparatus of this invention, to illustrate the appearance of contour lines on various shapes.
Figure 6E:
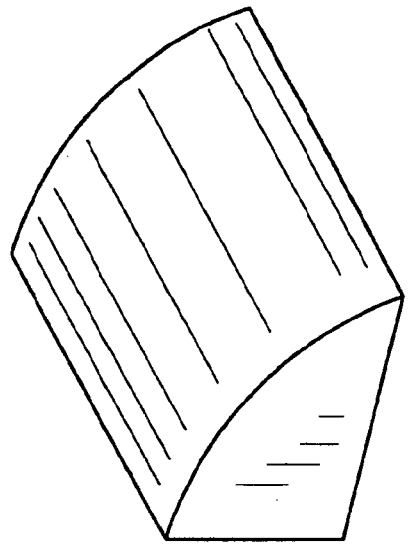
Figure 6A:
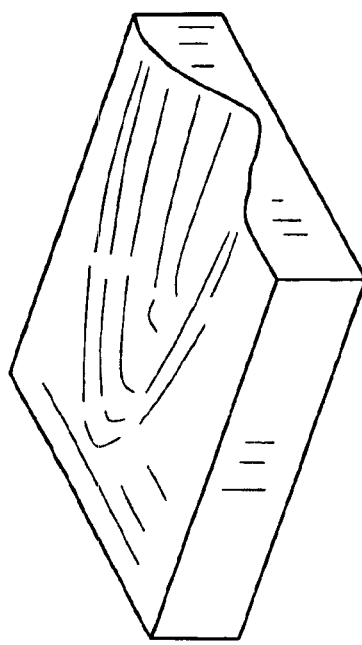
Figure 6B:
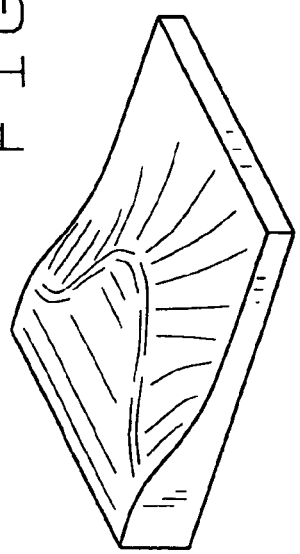
Figure 6C:
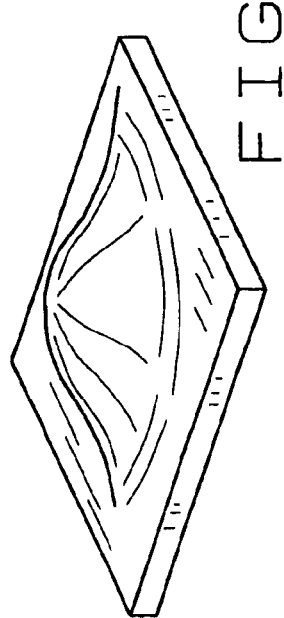
Figure 7:
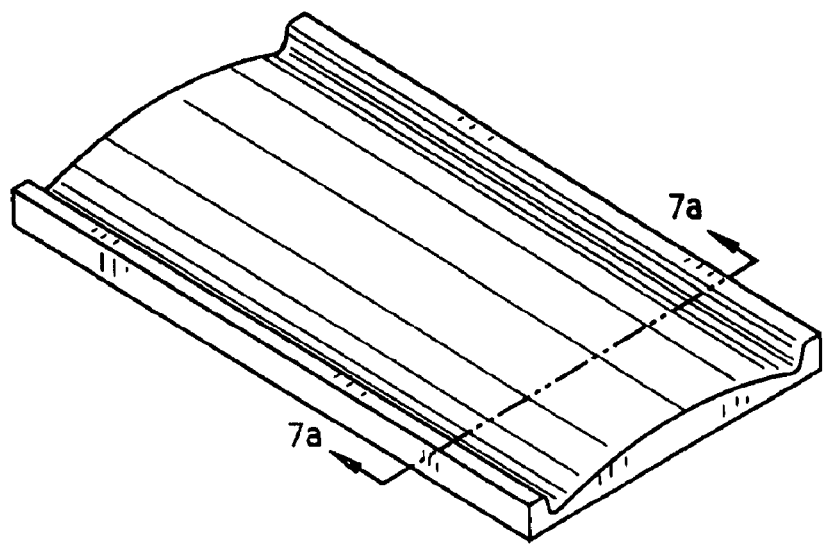
FIG. 7 is a perspective view of a model section of roadway that can be placed into the apparatus of this invention, to illustrate the appearance of contour lines on a roadway.
Figure 7A:
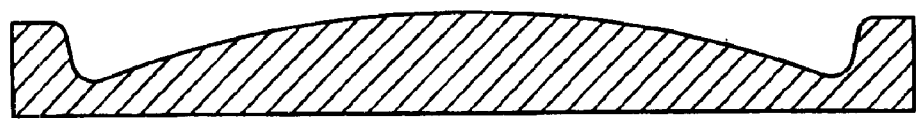
FIG. 7A is a transverse cross-sectional view of the roadway.

FIG. 4f is an enlarged plan view of the laser compartment 310, showing supports 320 for supporting lasers 312 at different heights so that the lasers project planes of light at different heights within the workspace 306.

FIG. 4g is an enlarged partial cross-sectional view taken along the plane of line 4g—4g in FIG. 4, showing the removable attachment of the lid 328, for example with threaded fasteners 344 that screw into the top of the walls 314.

A fourth embodiment of an apparatus constructed according to the principles of this invention is indicated as 400 in FIG. 5. The apparatus 400 comprises a bottom bed 402, and sidewalls 404. Two inner sidewalls 406 divide the apparatus into a generally rectangular work space 408, and a generally L-shaped utility space 410. The portions of the side walls 404 and 406 forming the work space 408 preferably have mirrors 412 to reflect light. In the corner of the "L" shaped utility space, at least one, and preferably a plurality of lasers 414 are arranged to provide fan-shaped beams of light into the work space 408. These beams reflect off the mirrors 412 forming planes of light at different heights within the work space. Small levels can be provided on the frame, and as shown in FIG. 5a, adjustable screw feet 416 can be provided to level the apparatus. A plurality of handles 418 can be provided on the outside of the apparatus for moving or transporting the apparatus. Other accessories can be provided in the "L" shaped utility apparatus. A drain 420 on the bottom bed 402 allows sand used in modeling to be removed from the work space 408.

The lasers 414 create a plurality of planes of light, one of which is indicated generally as 422 in FIG. 5. The plane 422 forms a line 424 where it intersects the surface of the model built in workspace 408. The intersection of the next higher plane forms a line 426 where it intersects the surface of the model built in workspace 406. Thus the contour lines 424 and 426 help show the contours of the surface, showing shapes and slopes.

What is claimed is:

1. An apparatus for depicting contour lines on the surface of a model, the apparatus comprising a bottom, a plurality of sidewalls surrounding the bottom, at least one interior wall inside the sidewalls defining a workspace and at least one other space; at least one window in the interior wall, and at least one laser source in one of the at least one other space of the apparatus adapted to project a generally fan-shaped laser beam through the at least one window in the interior wall and across the workspace.

2. The apparatus according to claim 1 wherein at least portions of the walls surrounding the workspace are reflective to reflect the fan-shaped laser beams.

3. The apparatus according to claim 1 wherein the at least one laser source comprises a plurality of laser sources adapted to project beams of different colors.

4. The apparatus according to claim 1 wherein the at least one laser source comprises a plurality of laser sources at different heights relative to the bottom.

5. The apparatus according to claim 1 wherein the at least one laser source is adapted to project a plurality of beams at equally spaced heights relative to the workspace.

6. The apparatus according to claim 1 wherein the generally fan-shaped laser beam is substantially horizontal.

7. The apparatus according to claim 1 wherein the at least one laser source is adapted to project a plurality of vertically spaced beams.

8. A method of depicting contour lines on surfaces of a model, the method comprising projecting a plurality of planes of light in spaced relation over the surface of a support to illuminate contour lines on objects on the surface that break the planes of light.

9. The method according to claim 8 wherein the planes of light are generally horizontal.

10. The method according to claim 9 wherein the planes of light are substantially equally vertically spaced.

11. The method according to claim 8 wherein the plurality of planes of light are protected horizontally over the surface at different heights.

12. The method according to claim 8 wherein projecting a plurality of planes of light comprises projecting adjacent planes of light having different colors.

13. The method according to claim 8 wherein the planes of light are reflected by at least one of a plurality of walls surrounding the support.

14. The method according to claim 8 wherein projecting a plurality of planes of light comprises projecting the planes from a plurality of laser sources at different heights relative to the support.

* * * * *